United States Patent [19]

De Baun

[11] E Re. 31,258

[45] Reissued May 31, 1983

[54] FLUID VELOCITY EQUALIZING APPARATUS

[75] Inventor: Kenneth W. De Baun, Santa Rosa, Calif.

[73] Assignee: Air Monitor Corporation, Santa Rosa, Calif.

[21] Appl. No.: 952,695

[22] Filed: Oct. 19, 1978

Related U.S. Patent Documents

Reissue of:

[64] Patent No.: 3,964,519
Issued: Jun. 22, 1976
Appl. No.: 524,740
Filed: Nov. 18, 1974

[51] Int. Cl.[3] ..... F15D 1/02

[52] U.S. Cl. ..... 138/37; 138/41

[58] Field of Search ..... 138/37, 39, 41, 44; 73/168

[56] References Cited

U.S. PATENT DOCUMENTS

| | | | |
|---|---|---|---|
| 3,572,391 | 3/1971 | Hirsch | 138/37 |
| 3,733,900 | 5/1973 | De Baun | 73/168 |
| 3,840,051 | 10/1974 | Akashi et al. | 138/37 |
| 3,842,678 | 10/1974 | De Baun et al. | 138/37 |

*Primary Examiner*—Lenard A. Footland
*Attorney, Agent, or Firm*—Ernest M. Anderson

[57] ABSTRACT

Apparatus for equalizing the velocity of fluids flowing in duct work and the like which comprises one or more rigid honeycomb sections having a plurality of coaxial passages wherein the ratio of the surface area of each passage to its cross-sectional area is in the order of thirty or greater *and the length of the individual passages is varied to provide longer passages in the center of the duct than along the sidewalls of the duct.*

2 Claims, 1 Drawing Figure

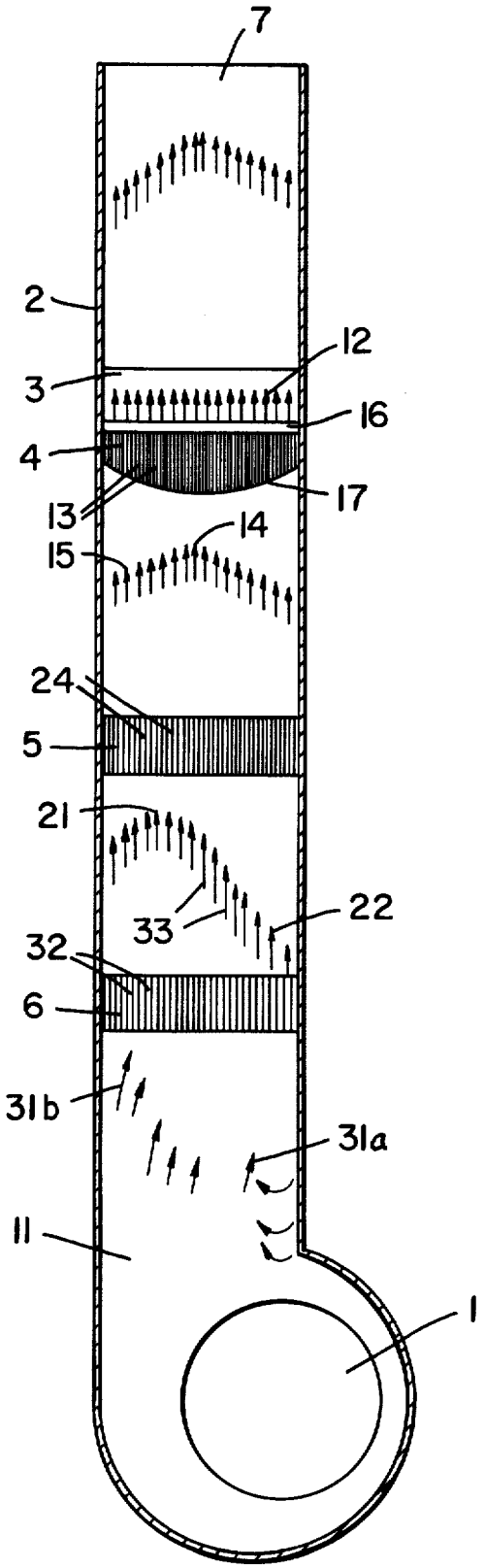
7
2
12
3
16
4
17
13
14
15
24
5
21
33
22
32
6
31b
31a
11
1

FLUID VELOCITY EQUALIZING APPARATUS

Matter enclosed in heavy brackets [ ] appears in the original patent but forms no part of this reissue specification; matter printed in italics indicates the additions made by reissue.

This invention relates generally to apparatus for conditioning the flow pattern fluids flowing in conduits and it more particularly refers to apparatus for equalizing the velocity profile of fluid flowing in a conduit. This invention is an improvement upon air conditioning apparatus of the type disclosed in U.S. Pat. No. 3,733,900 issued to Kenneth W. De Baun on May 22, 1973 and is useful in the type of apparatus disclosed in U.S. Pat. No. 3,842,678 issued to Kenneth W. De Baun and Robert W. Noll on Oct. 22, 1974.

The principal object of this invention is to modify the flow pattern of fluids flowing in enclosed conduits.

One object of the invention is to shape the velocity profile of air flowing in duct work used for air conditioning so that accurate air flow measurements can be made.

Other objects and advantages of the invention will become apparent from consideration of the following description of a specific embodiment and the accompanying drawings wherein The accompanying drawing is a schematic sectional elevational view of the apparatus with its components installed at the discharge of an air blower or fan.

The drawing illustrates schematically a fan or blower 1 delivering air through a conduit or duct 2 to an air conditioning or other system at its far end 7. The described system includes a curved equalizing honeycomb section 7, a straight equalizing honeycomb section 5, and a straightening honeycomb section 6.

Air being discharged from a blower or fan 1 typically has turbulent and stratified flow conditions at the discharge zone 11 as it enters typical air conditioning ductwork. The air may have greater velocity on one side of the duct such as at 31b and may have a variety of flow patterns such as the multi-directional turbulence shown at 31a. There also may be stratification with more air flowing at 31b than at 31a per unit cross-sectional area of the duct.

In order to measure the quantity of air flowing through the duct or to sample its constituents by instrumentation placed, for example, at 3 such as an air monitoring system of the type disclosed in the U.S. Pat. No. 3,685,355 or the sampling system disclosed in U.S. Pat. No. 3,842,678, the air flow must have a generally flat profile as shown at 12. The equalizing honeycomb sections 4 and 5 achieve the flat profile and the straightening honeycomb section 6 assists by initially straightening the turbulent pattern 31a, 31b at the fan discharge. As is more fully described in U.S. Pat. No. 3,733,900, to which reference is made above, the straightening honeycomb section 6 installed in the duct will straighten the direction of air flow from the turbulent condition at zone 11 to a generally coaxial flow condition at 33. However, the flow pattern still may have an irregular velocity profile with greater velocity along one side wall at 21 than along the other sidewall at 22, for example. The passages 32 in the straightening honeycomb section 6 are sized so that the straightening function can be accomplished.

The honeycomb section 6, and sections 4 and 5, are parallel cell, expanded honeycomb made of aluminum or other rigid material. The honeycomb forms a plurality of relatively small, coaxially extending passages that fill the entire cross-section of the duct 2. The depth, or axial extent of the honecomb is determined by the relationship of the passage opening area to the passage wall surface area. The wall thickness of the honeycomb is extremely small (96% free area) so that there is a negligible loss of air pressure when air flows through the honeycomb passages. To perform the straightening function, the ratio of the peripheral area of each passage to its cross-sectional area should be in the order of 6 for straigtening without undue pressure drop or drag on the fluid.

However, if the passages in the honeycomb have a substantially greater peripheral surface area relative to their cross-sectional area, they perform the velocity equalizing function of the equalizing honeycomb sections 4 and 5 of the present invention. Smaller diameter passages produce a drag effect on the fluid as it passes through them. Resistance to flow varies with the square of the fluid velocity so that the drag reduces the higher velocity air flow rates and permits the lower velocities to increase in relation to them. In this manner the high velocity of air at 21 passing through the passages 24 of the first equalizing honeycomb section 5 will be suppressed whereas that moving in the region 22 at slower velocity will not be suppressed as much. Therefore, after passing through equalizer honeycomb section 5 the air flow assumes the pattern illustrated at 14, 15 where there is less difference in the velocity between the air flowing in the center at 14 and that along the sidewalls at 15. *So much is known.*

[The] *It has now been found that the* velocity profile can be flattened even more by adding a subsequent equalizer honeycomb section 4. Instead of having straight walls like that of section 5 it may have an arcuately shaped edge facing the air stream as shown at 17 and a flat face 16 on the downstream side. The particular curvature can be adjusted to accommodate any air velocity profile of the fluid approaching the equalizer honeycomb 4 with, for example as shown in [FIG. 1] *the drawing*, longer passages 13 in the center for the higher velocity portions of air at 14 and shorter passages along the sidewall to accommodate the slower portions 15 of the approaching air stream. In this manner the velocity profile can be substantially flat like that at 12 when it enters the air monitoring or sampling instrumentation at 3.

In order to perform an air equalizing function to flatten the velocity profile of the flowing fluid the passages in the honeycomb must be substantially smaller in diameter than those for the air straightening function of a honeycomb such as section 6. In addition, there is a definite relationship between cross-sectional area and length. The most efficient air equalizing performances have been obtained using honeycomb passages wherein the ratio of the surface area of each passage to its cross-sectional area is in the order of 30 or greater. Thus, in typical air conditioning systems, the air straightening honeycomb section can be in the order of 3 inches long with hexagonally shaped openings ¾ inch across the flats. On the other hand, in order to perform the air equalizing function, the honeycomb passages of sections 4 and 5 in typical air conditioning systems should be in the order of 3 inches long and ⅜ inch across the flats of each hexagonal cross-section. Shaped equalizer honeycomb sections like 4 having lengths of 6 to 10 inches for the honeycomb passages and dimensions of ⅜ to 3/16 inch across the flats of the hexagonal cross-sections have been found to be useful.

It will be apparent that the descibed velocity equalizing apparatus is useful in a number of fluid flow applications. Various modifications of the described system will become apparent to those skilled in the art without departing from the scope of the invention defined in the following claims.

I claim:

[1. Apparatus for equalizing the velocity of flowing fluid including duct means defining a flowing stream of fluid; at least one open-ended honeycomb equalizing section substantially coaxial with said duct means, intercepting and conducting the fluid therethrough, said honeycomb section having a plurality of parallel passages across substantially the entire duct cross-section wherein the ratio of surface area of each passage to the cross-sectional area of each passage is at least 30.]

[2. The apparatus of claim 1 wherein the end of the honeycomb facing the stream of fluid is curved to flatten the velocity profile of the stream.]

[3. The apparatus of claim 1 further comprising an air straightening honeycomb section preceding the first-mentioned honeycomb section.]

[4. The apparatus of claim 3 wherein the ratio of the surface area of each passage of said straightening honeycomb section to its cross-sectional area is in the order of 6.]

[5. The apparatus of claim 1 wherein the parallel passages are approximately 3 inches in length or greater.]

[6. The apparatus of claim 1 wherein the parallel passages are of hexagonal cross-section having dimensions of ⅜ to 3/16 inch across flats.]

[7. The apparatus of claim 1 wherein the lengths of said parallel passages vary over the cross-sectional area of said conduit to equalize the fluid flow velocities across the cross-sectional area of said conduit.]

[8. Apparatus for equalizing the velocity of flowing fluid including duct means defining a flowing stream of fluid; at least one open-ended honeycomb equalizing section substantially coaxial with said duct means, intercepting and conducting the fluid therethrough, said honeycomb section having a plurality of passages across substantially the entire duct cross-section, said parallel passages having hexagonal cross-sections, each passage being approximately 3 inches in length or greater and having a dimension of ⅜ to 3/16 inch across flats.]

*9. Apparatus for equalizing the velocity of flowing fluid including duct means defining a flowing stream of fluid; at least one open-ended honeycomb equalizing section substantially coaxial with said duct means, intercepting and conducting the fluid therethrough, said honeycomb section having a plurality of parallel passages across substantially the entire duct cross-section wherein the ratio of surface area of each passage to the cross-sectional area of each passage is at least 30 and the end of the honeycomb facing the stream of fluid is curved to flatten the velocity profile of the stream.*

*10. The apparatus of claim 9 wherein the lengths of said parallel passages vary over the cross-sectional area of said conduit to equalize the fluid flow velocities across the cross-sectional area of said conduit.*

* * * * *